(12) United States Patent
Turato et al.

(10) Patent No.: US 11,769,403 B2
(45) Date of Patent: *Sep. 26, 2023

(54) SYSTEMS AND METHODS FOR FIBER OPTIC BASED VEHICLE-DIRECTION DETECTION

(71) Applicant: Verizon Patent and Licensing Inc., Basking Ridge, NJ (US)

(72) Inventors: John A. Turato, Garden City South, NY (US); Stephane Chaysinh, Basking Ridge, NJ (US); Brian Peebles, Cranford, NJ (US); Neha Yadav, Waltham, MA (US); Matthew W. Turlington, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,543

(22) Filed: Aug. 31, 2022

(65) Prior Publication Data

US 2022/0415169 A1  Dec. 29, 2022

Related U.S. Application Data

(63) Continuation of application No. 17/108,755, filed on Dec. 1, 2020, now Pat. No. 11,450,204.

(51) Int. Cl.
*G08G 1/056* (2006.01)
*G08G 1/04* (2006.01)
(Continued)

(52) U.S. Cl.
CPC ............. *G08G 1/056* (2013.01); *G01H 9/004* (2013.01); *G01V 8/24* (2013.01); *G06F 18/2148* (2023.01); *G06N 20/00* (2019.01); *G06Q 10/1093* (2013.01); *G06Q 40/08* (2013.01); *G06Q 50/205* (2013.01); *G06Q 50/265* (2013.01); *G06V 20/54* (2022.01); *G07C 5/008* (2013.01);
(Continued)

(58) Field of Classification Search
None
See application file for complete search history.

(56) References Cited

U.S. PATENT DOCUMENTS 9,127,955 B2 *  9/2015  Tsimhoni ............ G01C 21/3484
9,640,072 B2 *  5/2017  White ....................... E01F 13/06
(Continued)

*Primary Examiner* — Fekadeselassie Girma

(57) ABSTRACT

A device may receive fiber sensing data identifying vehicles traveling on a roadway associated with a fiber optic network and location data identifying geographical locations of the vehicles traveling on the roadway. The device may process the fiber sensing data, with a machine learning model, to identify a particular vehicle, of the vehicles, that is traveling in a wrong direction on the roadway. The device may process the location data, with the machine learning model, to identify locations of the roadway, a cellular network associated with the roadway, and vehicle devices of the vehicles traveling on the roadway, other than the particular vehicle, and a nearest camera device to the particular vehicle. The device may perform one or more actions based on the locations of the roadway, the cellular network associated with the roadway, and the vehicle devices of the vehicles traveling on the roadway, other than the particular vehicle.

20 Claims, 11 Drawing Sheets

(51) Int. Cl.
*G08G 1/017* (2006.01)
*G06N 20/00* (2019.01)
*G07C 5/00* (2006.01)
*G06Q 50/26* (2012.01)
*G06Q 10/1093* (2023.01)
*G06Q 50/20* (2012.01)
*G06Q 40/08* (2012.01)
*G01H 9/00* (2006.01)
*G01V 8/24* (2006.01)
*G09B 19/16* (2006.01)
*H04B 10/073* (2013.01)
*G06V 20/54* (2022.01)
*G06F 18/214* (2023.01)
*B60K 28/00* (2006.01)

(52) U.S. Cl.
CPC ............... *G08G 1/017* (2013.01); *G08G 1/04* (2013.01); *G09B 19/167* (2013.01); *H04B 10/073* (2013.01); *B60K 28/00* (2013.01)

(56) References Cited

U.S. PATENT DOCUMENTS

| | | | |
|---|---|---|---|
| 9,865,100 B2* | 1/2018 | Noh | B62D 5/0481 |
| 10,081,370 B2* | 9/2018 | Roth | H04W 4/16 |
| 10,124,267 B1* | 11/2018 | Bachman | A63F 9/143 |
| 2016/0210856 A1* | 7/2016 | Assenbaum | G08G 1/164 |
| 2017/0025003 A1* | 1/2017 | Arpin | G08G 1/166 |
| 2018/0218608 A1* | 8/2018 | Offenhaeuser | G08G 1/162 |
| 2018/0281782 A1* | 10/2018 | Salter | G08G 1/056 |
| 2019/0050634 A1* | 2/2019 | Nerayoff | G06F 18/22 |
| 2019/0084559 A1* | 3/2019 | Sim | B60W 60/0015 |
| 2019/0382016 A1* | 12/2019 | Chow | B60W 30/18009 |
| 2021/0097866 A1* | 4/2021 | Leary | G08G 1/202 |
| 2021/0114638 A1* | 4/2021 | Cross | B61L 23/06 |
| 2021/0241615 A1* | 8/2021 | Narisetty | G08G 1/02 |
| 2022/0067408 A1* | 3/2022 | Sheu | G06V 20/584 |
| 2022/0172611 A1* | 6/2022 | Turato | G08G 1/0175 |
| 2022/0237926 A1* | 7/2022 | Jumonji | G08G 1/056 |
| 2022/0415169 A1* | 12/2022 | Turato | G08G 1/0129 |

* cited by examiner

SYSTEMS AND METHODS FOR FIBER OPTIC BASED VEHICLE-DIRECTION DETECTION

RELATED APPLICATION

This application is a continuation of U.S. patent application Ser. No. 17/108,755, entitled "SYSTEMS AND METHODS FOR FIBER OPTIC BASED VEHICLE-DIRECTION DETECTION," filed Dec. 1, 2020, which is incorporated herein by reference in its entirety.

BACKGROUND

Fiber optic cables are deployed across vast geographic areas to provide network connectivity to users. In optical communication systems using fiber optic cables, optical transmitters may transmit light through the fiber optic cables to convey data that is encoded in a frequency, an amplitude, or another characteristic of the light. An optical receiver may receive the light and determine the data that is being conveyed based at least in part on the frequency, the amplitude, or another characteristic of the light. Under ideal conditions, light that is transmitted by the transmitter is nearly identical to light that is received by the receiver. In other words, under ideal conditions the fiber optic cables do not alter the light that is being used to convey data. However, in real-world applications, the fiber optic cables themselves, as well as the environment around the fiber optic cables may alter light as the light propagates through the fiber optic cables.

DETAILED DESCRIPTION OF PREFERRED EMBODIMENTS

Figure 1A:
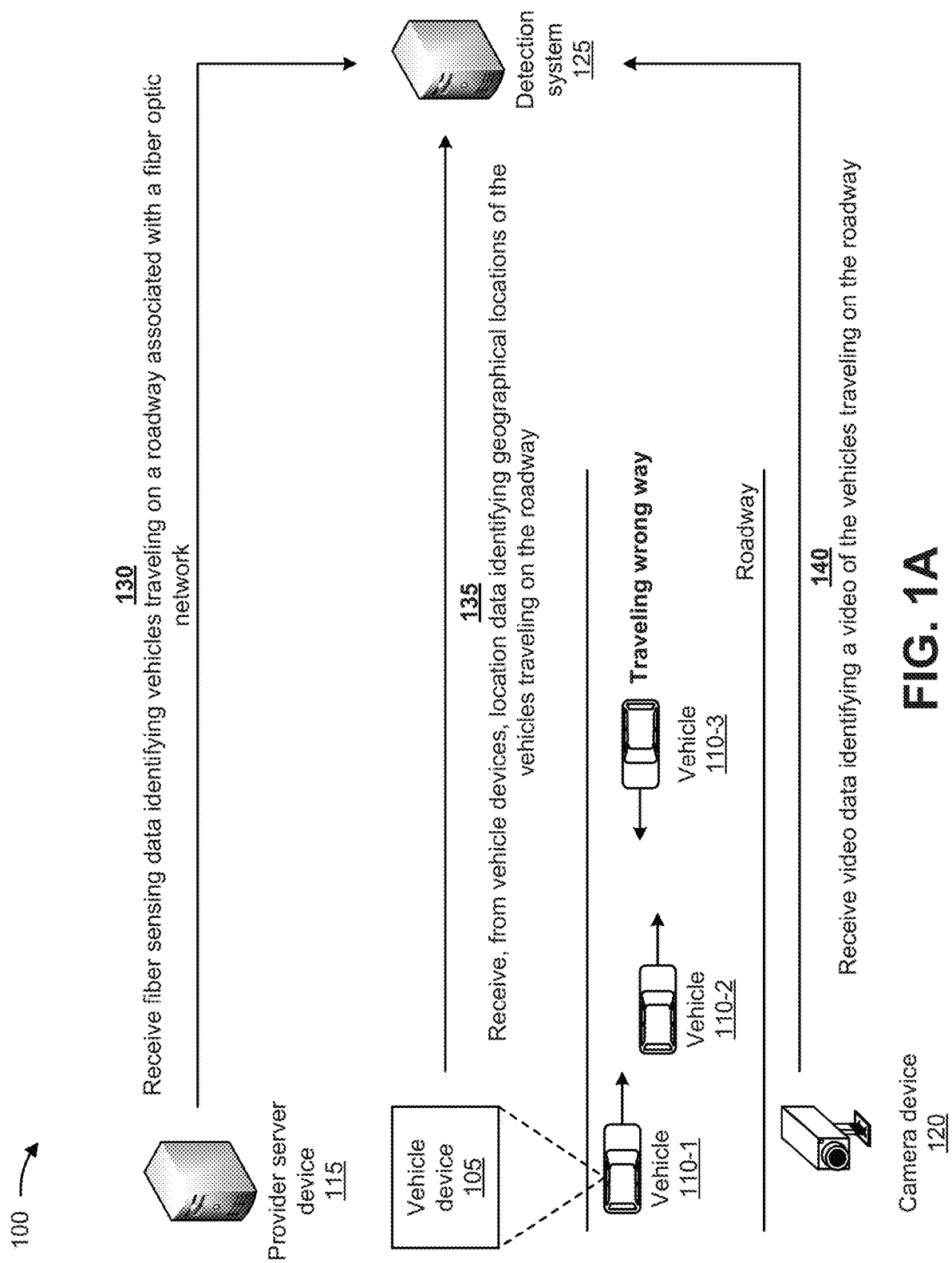
FIGS. 1A-1G are diagrams of an example associated with fiber optic based vehicle-direction detection.

The following detailed description of example implementations refers to the accompanying drawings. The same reference numbers in different drawings may identify the same or similar elements.

Failure to accurately follow traffic rules, such as by driving in the wrong direction on a roadway, whether due to human error or an issue with the one or more autonomous vehicle navigation components, may result in a vehicle breaking one or more laws, being involved in a collision, and/or the like. Due to the vehicle breaking one or more laws, a law enforcement agency may consume resources (e.g., computing resources, network resources, vehicle resources, and/or the like) determining that the vehicle broke the law, identifying an owner of the vehicle, issuing a ticket to the owner of the vehicle, and/or the like. The owner of the vehicle, in turn, may consume resources responding to the ticket, correcting an issue with the one or more autonomous vehicle navigation components, and/or the like. As another example, due to the vehicle being involved in a collision, the vehicle may suffer hardware damage and/or cause hardware damage in one or more other objects. As a result, resources may be consumed repairing and/or replacing damaged hardware of the vehicle and/or the one or more other objects. Furthermore, in response to the collision, a law enforcement agency may consume resources (e.g., computing resources, network resources, vehicle resources, and/or the like) responding to calls about the collision, identifying a location of the collision, clearing a scene of the collision, and/or the like.

Some systems may be deployed to assist in identifying vehicles that are failing to follow traffic laws. For example, a first autonomous vehicle may detect that a second autonomous vehicle (or non-autonomous vehicle) is failing to follow traffic rules. However, autonomous vehicles may be relatively rare, which may reduce a likelihood that an autonomous vehicle is able to observe a failure to follow traffic rules. Similarly, location services (e.g., in a navigation system of the vehicle or in a user equipment (UE) being used in the vehicle) may determine certain characteristics, such as a speed of the vehicle or a direction of the vehicle, among other examples. However, location services may be limited in accuracy (e.g., a navigation system may not be able to resolve on which side of a road a vehicle is traveling) or in availability (e.g., some vehicles may lack a navigation system or location services may be inactive on a UE), among other limitations.

As another example, a camera may be deployed to monitor vehicles in a particular area of a roadway and determine whether the vehicles are, for example, failing to stop at a red light. Similarly, a radar-based speed detection device may be deployed to determine if a vehicle is traveling faster than a set speed limit. However, such devices may be limited to a particular field-of-vision. Moreover, such devices may be expensive to deploy, resulting in relatively few devices being deployed, which may limit a utility in identifying and preventing failures to follow traffic rules in real-time. Furthermore, such devices may have a limited use case, such as cameras being used for red light detection and radar devices being used for excess speed detection, which may fail to cover other possible failures to follow traffic rules, such as vehicles traveling an incorrect direction on a roadway.

As described above, during propagation of light through a fiber optic cable, environmental factors may affect the light. For example, when a vehicle travels along a road, the vehicle may cause vibrations that may propagate through the ground or air, among other examples, to fiber optic cables located within a threshold proximity of the road (e.g., fiber optic cables mounted on poles along the road or buried in the ground along the road). The vibrations may affect a propagation of light along the fiber optic cable. Thus, some implementations described herein may determine compliance with traffic rules based on measurements of light propagating through fiber optic cables, in some embodiments taking advantage of machine learning or other models.

Based on fiber optic cables being widely deployed (and being deployed over ever-increasing geographic areas to provide enhanced network connectivity), fiber sensing based detection of traffic rule compliance (e.g., whether a vehicle is traveling the correct direction on a road) may improve prevention of collisions relative to the aforementioned techniques that may have much more limited geographic coverage. Moreover, based on using fiber sensing with machine learning, other models, other integrated sensors (e.g., fiber sensing in combination with computer vision applied to traffic cameras), implementations described herein improve a speed at which traffic rule compliance detection is performed, which may enable proactive prevention of, for example, collisions. Based on improving a likelihood of preventing collisions, implementations described herein reduce resource utilization associated with occurrences of collisions, as described above. Furthermore, based on using fiber sensing in already-deployed fiber optic cables rather than dedicated device deployment (e.g., of speed cameras or radar devices), implementations described herein may reduce a utilization of resources associated with manufacturing, installing, and/or monitoring such devices.

FIGS. 1A-1G are diagrams of an example 100 associated with fiber optic based vehicle-direction detection. As shown in FIGS. 1A-1G, example 100 includes a set of vehicle devices 105 operating in or on a set of vehicles 110, a provider server device 115, a camera device 120, and a detection system 125.

As further shown in FIG. 1A, and by reference numbers 130-140, detection system 125 may receive data from a set of devices. For example, as shown by reference number 130, detection system 125 may receive data output in real-time from provider server device 115, which may obtain fiber sensing data from a set of fiber optic cables and provide the fiber sensing data to detection system 125. The fiber sensing data may include a fiber vibration graph, as shown in more detail with regard to FIG. 1B. For example, the fiber sensing data may include a fiber vibration graph identifying variations in an optical signal traveling through a fiber optic cable at a location in proximity to a roadway. In this case, the fiber vibration graph may include information identifying fiber vibration (e.g., vibration occurrence, vibration amplitude, vibration frequency, or another vibration characteristic) as a function of time, location along a fiber optic cable, and/or the like. In other words, as described in more detail herein with regard to FIG. 1G, detection system 125 may receive information identifying a propagation of vibrations through a fiber optic cable, which detection system 125 may use to detect anomalies, such as a particular vibration propagating in a first direction (e.g., vehicle 110-3 traveling in the wrong direction) that is opposite of a second direction in which other vibrations propagate (e.g., vehicles 110-1 and 110-2 traveling the correct direction).

Figure 1B:
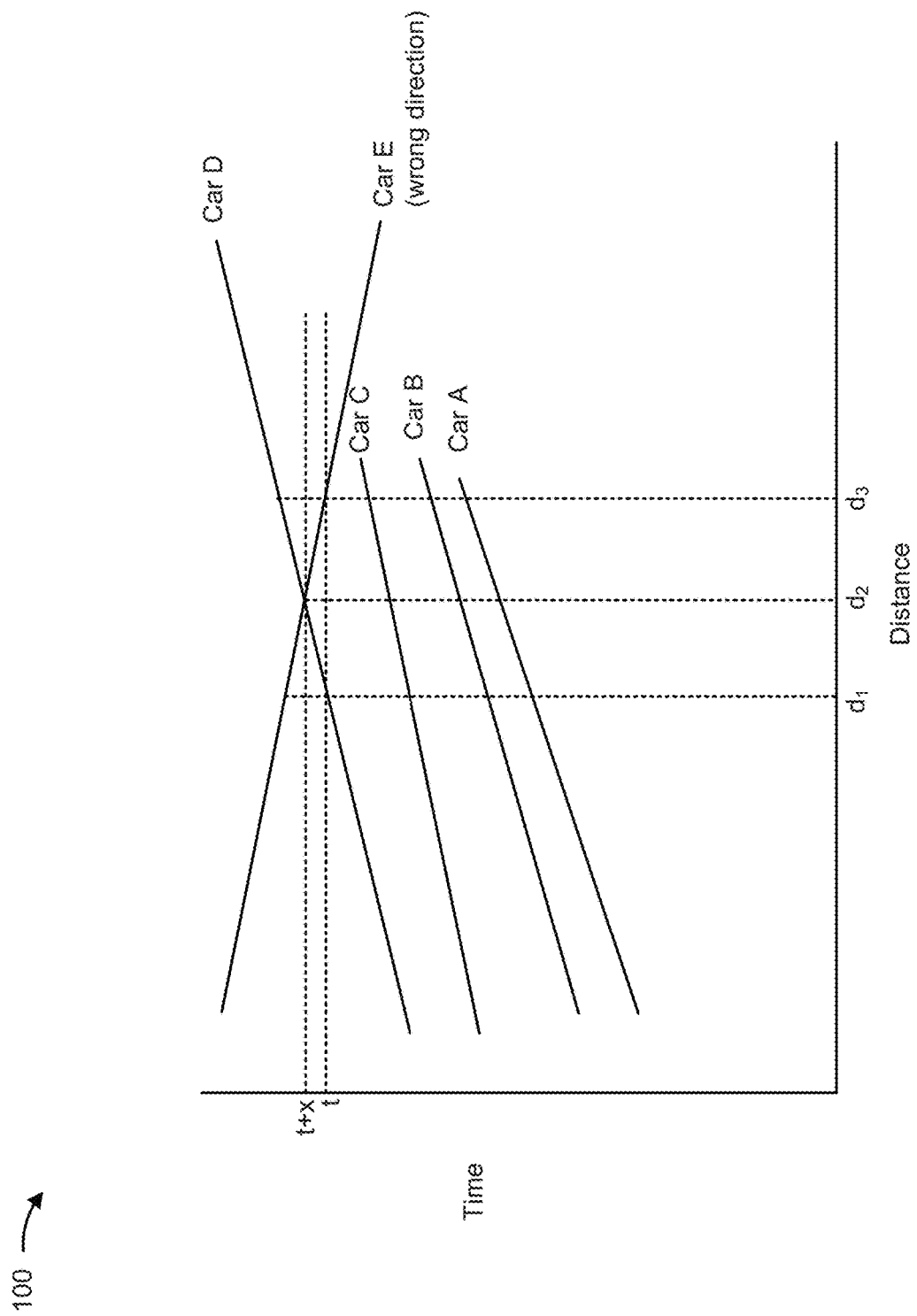

With regard to FIG. 1B, the fiber vibration graph may represent a set of paths of a set of vehicles (Cars A through E) as a function of distance over time. As shown, at time t, Car D is at position $d_1$ and car E is at position $d_3$. Subsequently, at a time t+x, both Car D and Car E are at position $d_2$. In this case, if normal traffic is represented as traffic moving from left to right (e.g., from $d_1$ towards $d_2$ and from $d_2$ toward $d_3$), then detection system 125 may detect that Car E is traveling the wrong direction based on the fiber vibration graph (e.g., which detection system 125 may determine using machine learning, computer vision, mathematical analysis techniques, and/or the like).

Returning to FIG. 1A, as another example of data collection, as shown by reference number 135, detection system 125 may receive location data from one or more vehicle devices 105. For example, detection system 125 may receive location data identifying geographical locations of vehicles traveling on the roadway. Detection system 125 may receive location data continuously, periodically, based on a request, or based on an event, among other examples. For example, a vehicle device 105 may periodically provide location information to detection system 125 via a tracking area update (TAU) procedure to maintain network connectivity. Additionally, or alternatively, vehicle device 105 may provide location information when requesting location-specific services, such as real-time traffic information regarding a particular location. Additionally, or alternatively, vehicle device 105 may provide location information as a response to a request. For example, when detection system 125 determines that a vehicle 110-3 is traveling in the wrong direction, as described in more detail herein, detection system 125 may request updated location information from one or more vehicle devices 105 whose last provided location or predicted current location (e.g., based on direction travel), among other examples, is within a threshold proximity of vehicle 110-3, thereby enabling detection system 125 to obtain more granular, updated location information.

As another example of data collection, as shown by reference number 140, detection system 125 may receive video data from camera device 120. For example, detection system 125 may receive video data including a video of vehicles traveling on the roadway. As described above with regard to location information, detection system 125 may receive video data continuously, periodically, based on an event, or as a response to a request, among other examples.

Figure 1C:
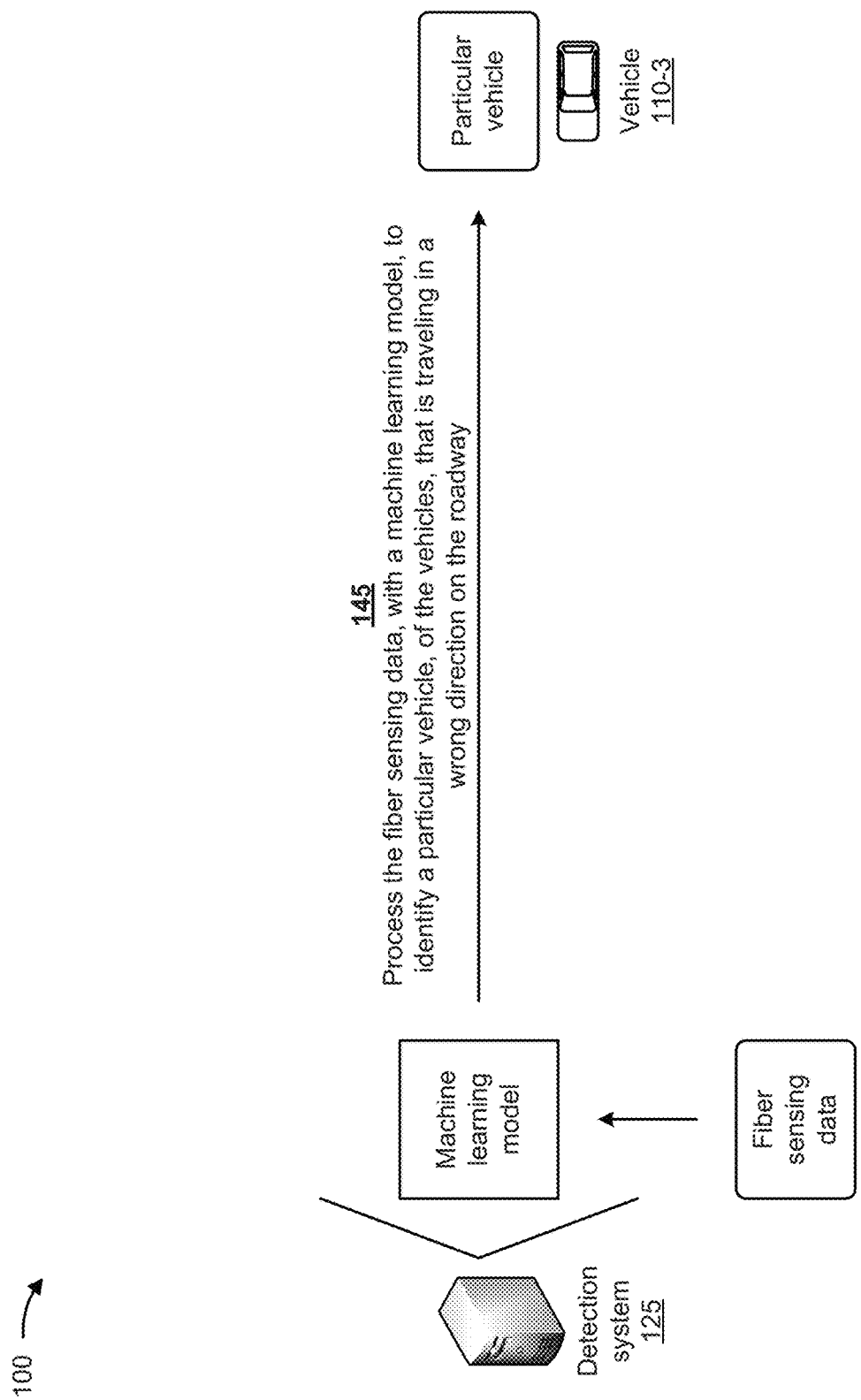

As further shown in FIG. 1C, and by reference number 145, detection system 125 may process the fiber sensing data with the machine learning model. For example, detection system 125 may feed the fiber sensing data into the machine learning model to determine that a vehicle (e.g., vehicle 110-3) is traveling the wrong direction on the roadway. Detection system 125 may use the machine learning model to determine whether a vibration graph at a particular location has a threshold match with a graph signature associated with a vehicle traveling in the wrong direction. Additionally, or alternatively, detection system 125 may use a computer-vision processing technique to analyze the fiber sensing data. For example, detection system 125 may use computer-vision processing to detect whether a fiber vibration graph, generated using fiber sensing data, is classifiable as showing a vehicle traveling in the wrong direction. In this case, detection system 125 may be trained to use computer-vision processing to analyze, for example, a fiber vibration graph using a data set of fiber vibration graphs depicting vehicles traveling in the correct direction and/or the wrong direction.

Additionally, or alternatively, detection system 125 may use a mathematical approach to determine whether a vehicle is traveling in the wrong direction. For example, detection system 125 may convert a fiber vibration graph into a set of values and analyze whether the set of values indicate a vehicle traveling in the wrong direct. Although some aspects described herein relate to a set of techniques for analyzing fiber sensing data to detect a vehicle traveling in the wrong direction, other techniques for analyzing the fiber sensing data and/or other available data may be possible. As another example of a mathematical technique, detection system 125 may determine a vehicle intensity for a vehicle based on a detected vibration frequency, a calculated vehicle weight, a detected vehicle speed, an estimated distance of the vehicle from a fiber. In this case, detection system 125 may determine whether the vehicle intensity is within a particular interval of a minimum vehicle intensity threshold and a maximum vehicle intensity threshold. In some implementations, detection system 125 may use multiple threshold for multiple factors, such as a speed threshold, a frequency threshold, an amplitude threshold, and/or the like and may weight the thresholds to determine an overall threshold. In this case, detection system 125 may determine that a vehicle is traveling in the wrong direction when, for example, the overall threshold is satisfied indicating that one or more calculated parameters are within ranges determined to correspond to a vehicle moving in the wrong direction (e.g., where the thresholds are based at least in part on calculations performed on vehicles known to be moving in the correct direction or wrong direction).

In this case, detection system 125 may use machine learning, mathematical processing, computer-vision processing, other similar techniques to determine a location of a vehicle traveling in the wrong direction, a distance between a fiber line source (where vibrations are detected) and an endpoint of a fiber optic cable that includes the fiber line source, a direction that the vehicle is traveling, a speed at which the vehicle is traveling, among other determinations performed regarding the fiber sensing data, as described in more detail herein. Additionally, or alternatively, detection system 125 may determine that the graph signature corresponds to a vehicle prohibited from traveling the wrong direction on the road. For example, detection system 125 may determine that detected vibrations are from a car, rather than from a pedestrian or bicycle traveling along a sidewalk, an animal, an emergency response vehicle (e.g., traveling in a shoulder lane), among other examples. In such cases, detection system 125 may use machine learning, computer-vision processing, mathematical techniques, and/or the like to distinguish between, for example, a car and a pedestrian, as described above.

Figure 1D:
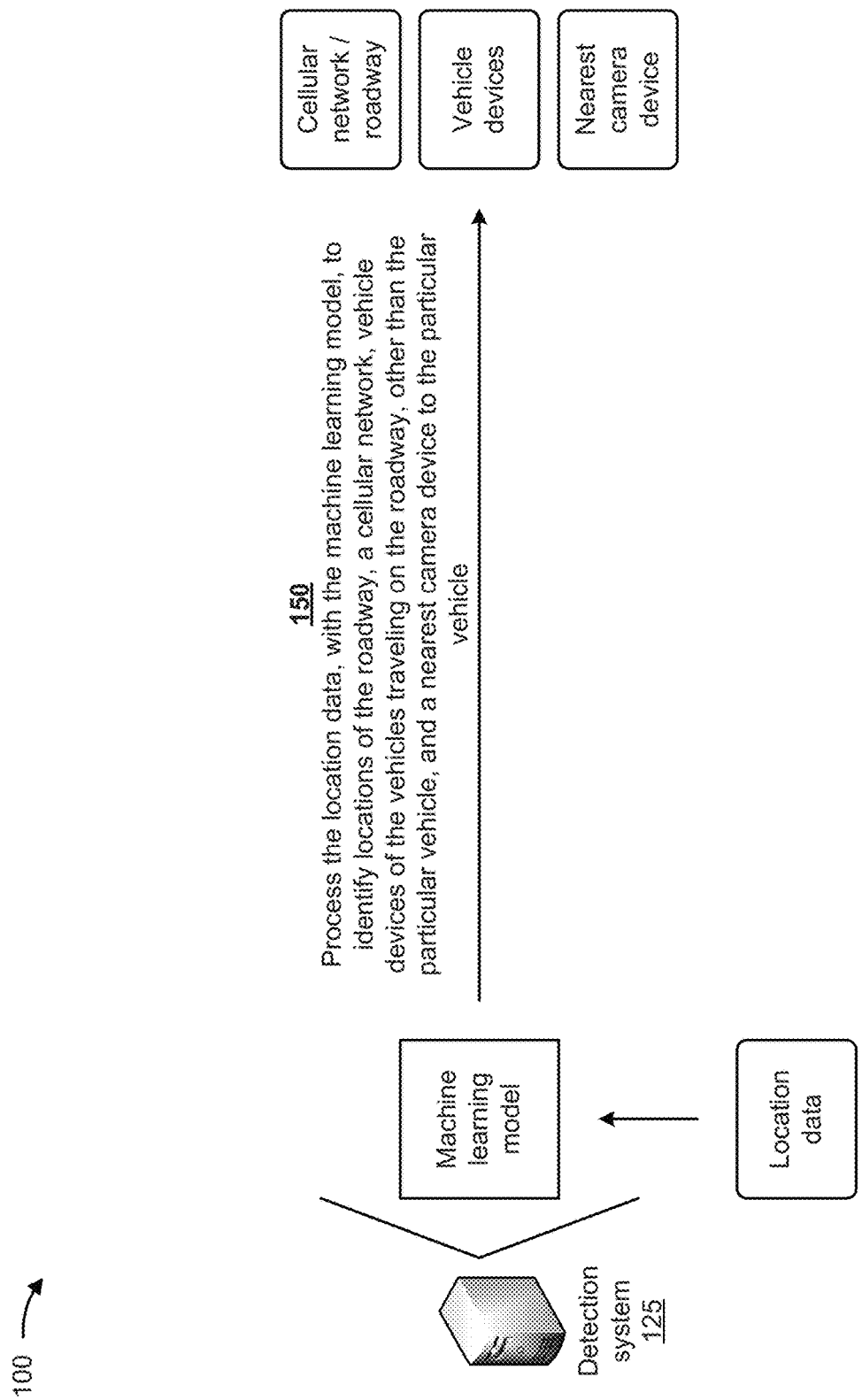

As further shown in FIG. 1D, and by reference number 150, detection system 125 may process the location data with the machine learning model to determine contextual data for performing a response action. For example, detection system 125 may use the location data to identify a location on the roadway, a cellular network covering the location on the roadway, a set of vehicle devices 105 associated with vehicles 110 traveling near the location on the roadway, or an identify of a camera device 120 with a field-of-vision covering the location on the roadway, among other examples. In this case, detection system 125 may request additional information from other devices. For example, detection system 125 may request location data from vehicle devices 105 in proximity to vehicle 110-3 or camera data from camera devices 120 in proximity to vehicle 110-3, among other examples.

Figure 1E:
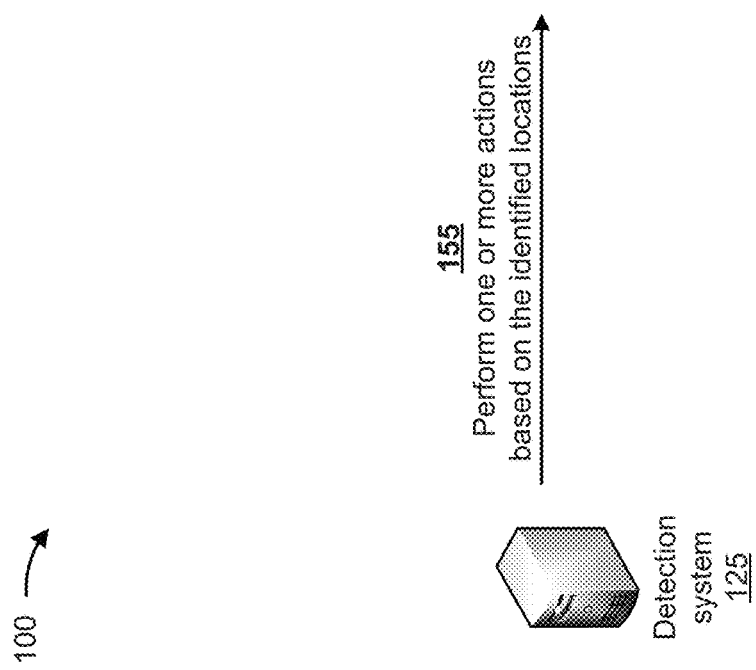

As further shown in FIG. 1E, and by reference number 155, detection system 125 may perform one or more actions based on determining the contextual data. For example, detection system 125 may provide an alert message indicating that vehicle 110-3 is traveling in the wrong direction, as described in more detail herein, to enable drivers of other vehicles to get out of the way of vehicle 110-3 or use extra caution while driving. Additionally, or alternatively, detection system 125 may cause autonomous vehicles or navigation systems of non-autonomous vehicles to navigate away from vehicle 110-3, by turning onto other streets or pulling over to the side of the road, among other examples. Detection system 125 may provide information to law enforcement, such as an alert message identifying vehicle 110-3 (e.g., a license plate number captured using data from a camera device 120 obtained based on determining that vehicle 110-3 is traveling in the wrong direction from fiber sensing data) or a location of vehicle 110-3. In this case, detection system 125 may provide the alert message to, for example, a network device associated with a cell and the network device may distribute the alert to all UEs in the cell, to a selected subset of UEs in the cell, and/or the like. In some implementations, detection system 125 may automatically schedule a driver of vehicle 110-3 (e.g., based on obtaining driver information from a database linking, for example, license plate information with driver information) for a defensive driving course. Similarly, detection system 125 may automatically generate a summons (e.g., a traffic ticket) for vehicle 110-3 or provide information to an insurer of vehicle 110-3 (and/or automatically update an insurance rate charged for vehicle 110-3).

In some implementations, detection system 125 may automatically disable vehicle 110-3 by communicating with an autonomous vehicle system or a connected interlock system, among other examples, of vehicle 110-3. Similarly, detection system 125 may cause an alert to be provided for display on a display associated with vehicle 110-3 (e.g., a dashboard display or a display of a UE used by a driver of vehicle 110-3). For example, when a driver of vehicle 110-3 inadvertently turns onto a one-way street in the wrong direction, the driver may not be aware that vehicle 110-3 is traveling in the wrong way, so detection system 125 may provide a notification to alert the driver, thereby enabling the driver to take corrective action.

In some implementations, detection system 125 may automatically update a machine learning model used for detection of failure to comply with traffic requirements. For example, when detection system 125 detects a vehicle traveling the wrong direction using fiber sensing data and then confirms whether the vehicle really was traveling the wrong direction using a computer-vision model applied to video data, detection system 125 may update the machine learning mode or the computer-vision model, as described herein with regard to FIG. 2.

Figure 1F:
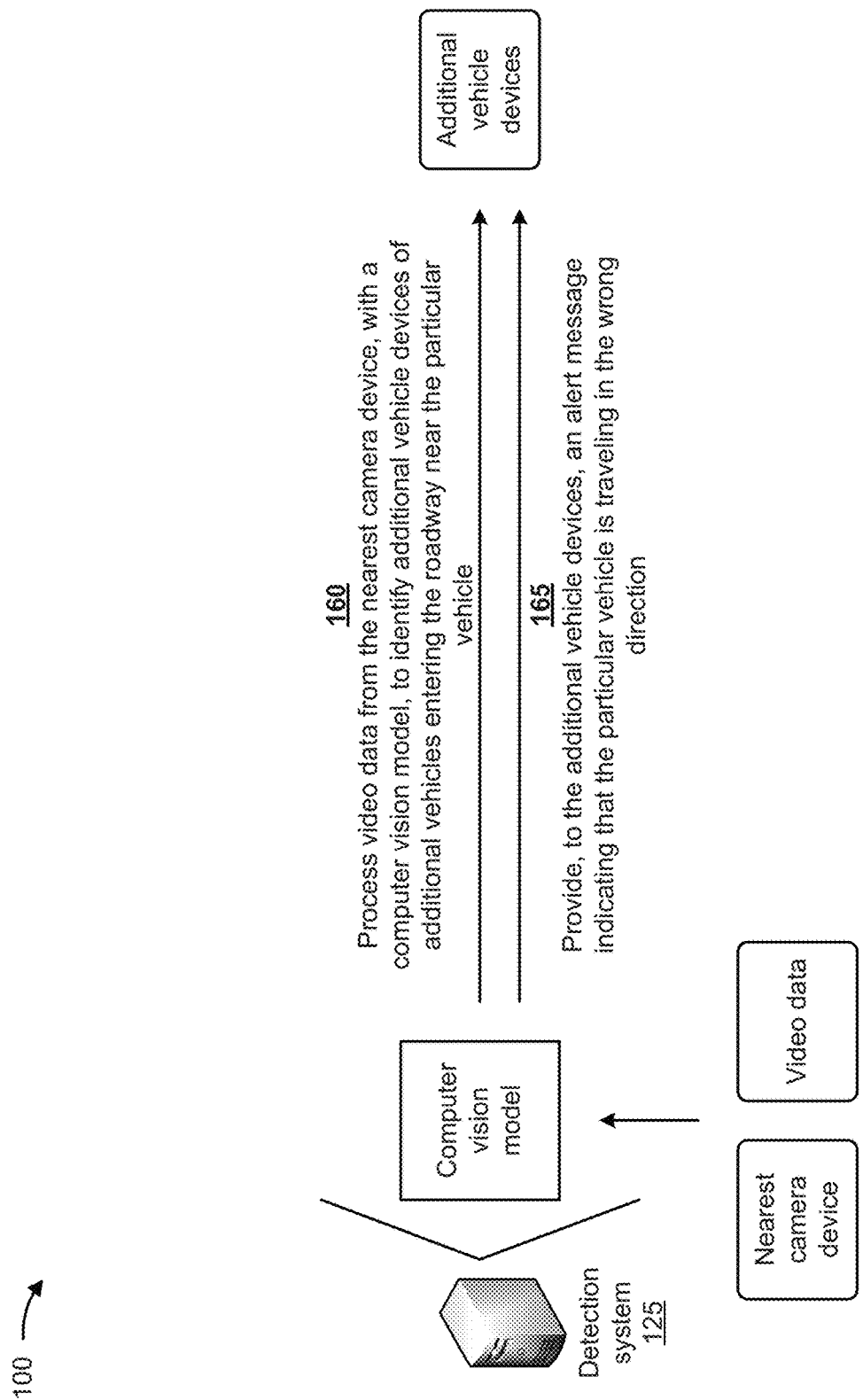

As further shown in FIG. 1F, and by reference number 160, as a particular example of a response action, detection system 125 may process video data from one or more other camera devices to identify one or more other vehicles. For example, detection system 125 may determine that one or more other vehicles are predicted to enter the roadway near vehicle 110-3, which is traveling in the wrong direction. In this case, detection system 125 may predict whether a vehicle is entering the roadway based on fiber sensing data, camera data (e.g., data from a camera device 120 processed using a computer vision model to identify a license plate, a speed, or a direction), location data, navigation system data (e.g., identifying a planned route of a vehicle), or other data, as described above. As shown by reference number 165, based on detecting one or more other vehicles traveling toward the roadway, detection system 125 may perform one or more response actions in relation to the one or more other vehicles. For example, detection system 125 may provide an alert message to a vehicle device operating in a particular vehicle of the one or more other vehicles to notify a driver of the particular vehicle that vehicle 110-3 is traveling in the wrong direction near the particular vehicle. Additionally, or alternatively, detection system 125 may route an autonomous vehicle away from the roadway or provide navigation information to cause a user to drive a non-autonomous vehicle away from the roadway.

Figure 1G:
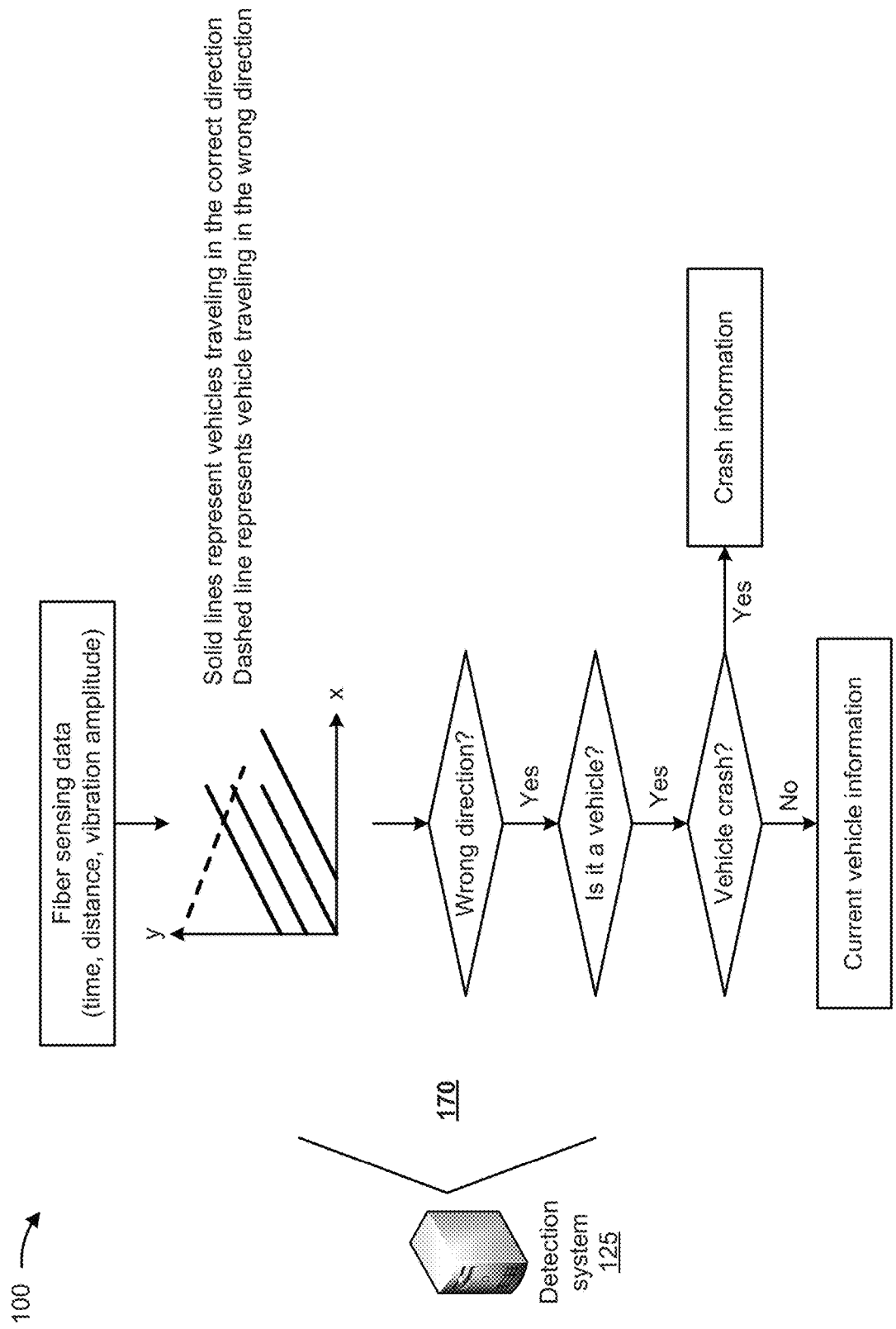

As further shown in FIG. 1G, and by reference number 170, when determining whether a vehicle is traveling in the wrong direction, detection system 125 may perform a detection procedure. For example, detection system 125 may receive or generate a fiber vibration graph that shows vibrations as a function of time. In this case, vibrations may predominantly have a first slope (in this case, a positive slope) for vehicles traveling in a first direction, but a vehicle traveling in a second direction may cause a vibration with a second slope (in this case, a negative slope). Detection system 125 may detect anomalous vibrations using mathematical techniques, computer vision techniques, or other techniques used by a machine learning system, as described herein.

Based on detecting an anomalous vibration, detection system 125 may use the machine learning model to determine whether the anomalous vibration corresponds to a vibration moving in the wrong direction, whether the vibration is from a vehicle (and/or a type of vehicle, such as distinguishing between a car and a truck based on an amplitude of the vibration), whether the vehicle has crashed (which may be associated with a particular pattern of vibrations or which may be determined by using camera data from a location identifying using the fiber sensing data), among other determinations. As described above, detection system 125 may use other techniques for analyzing a vibration, such as computer-vision techniques (e.g., to detect a shape of a plot of vibration data), mathematical analysis techniques (e.g., to calculate a slope, amplitude, intercept, or other characteristic, a statistical variance or similarity of the slope, amplitude, intercept, or other characteristic to slopes, amplitudes, intercepts, or other characteristics determined to correspond to vehicles, pedestrians, etc.), and/or other available techniques.

When detection system 125 determines that the vehicle has crashed, detection system 125 may perform first response actions, such as transmitting crash information to emergency response vehicles. In contrast, when detection system 125 determines that the vehicle has not crashed (and is traveling in the wrong direction), detection system 125 may perform second response actions, as described above, such as identifying the vehicle or transmitting alerts, among other examples.

In this way, detection system 125 enables use of fiber sensing data to detect vehicles traveling in the wrong direction and to perform response actions to prevent, mitigate, or respond to collisions. Based on automatically avoiding, mitigating, or responding to collisions, detection system 125 may improve traffic safety, reduce utilization of resources, or obviate a need to deploy specialized sensors across vast geographic areas, among other examples, relative to not deploying traffic safety systems or deploying other systems for traffic safety.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
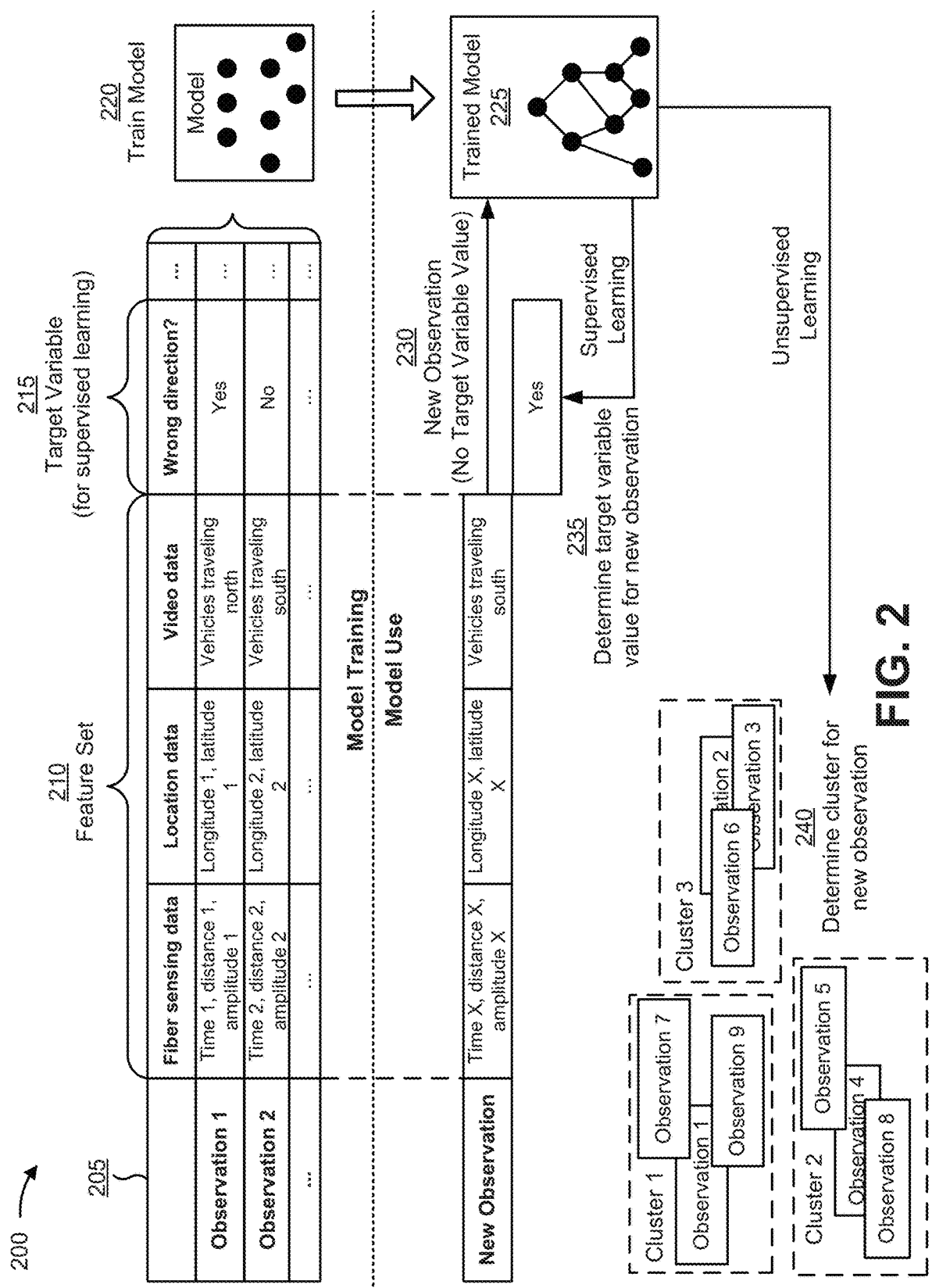
FIG. 2 is a diagram illustrating an example of training and using a machine learning model in connection with fiber optic based vehicle-direction detection.

FIG. 2 is a diagram illustrating an example 200 of training and using a machine learning model in connection with fiber optic based vehicle-direction detection. The machine learning model training and usage described herein may be performed using a machine learning system. The machine learning system may include or may be included in a computing device, a server, a cloud computing environment, and/or the like, such as the detection system 125 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from fiber optic cables, provider server device 115, vehicle device 105, or camera device 120, among others, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from fiber optic cables, provider server device 115, vehicle device 105, or camera device 120, among other examples. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of fiber sensing data, a second feature of location data, a third feature of video data, and so on. Although this example is described in terms of fiber sensing data combined with other data for a machine learning model, as another example, each aspect of fiber sensing data may be a feature (e.g., a first feature may be a time, a second feature may be a distance, a third feature may be an amplitude, among other examples for a machine learning model using only fiber sensing data) As shown, for a first observation, the first feature may have a value of a first time, distance, and amplitude, the second feature may have a value of a first longitude coordinate and latitude coordinate, the third feature may have a value of a direction of vehicle travel (or, when the model includes a computer vision component, the third feature may have raw video data that the computer vision model may process to identify vehicle direction during model training), and so on. These features and feature values are provided as examples, and may differ in other examples. For example, the feature set may include one or more of the following features: global positioning system (GPS) data, sensor data from autonomous vehicles, environmental condition data (e.g., which may be used in distinguishing vehicle-based vibrations from environmental-based vibrations), fiber line distance data, fiber source data, fiber destination data, cell coverage data (e.g., a cellular identifier, data identifying whether a cell corresponding to the cellular identifier covers a particular geographic location, etc.), base station location data, map data, or traffic data, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is whether a vehicle is traveling in the wrong direction, which has a value of yes for the first observation.

The feature set and target variable described above are provided as examples, and other examples may differ from what is described above. For example, for a target variable of whether a detected anomalous vibration corresponds to a vehicle (or a pedestrian, animal, or bicycle traveling along or crossing a roadway), whether a collision is detected, or whether video data includes a vehicle traveling in the wrong direction (for a computer vision model), among other examples, the feature set may include other variables, such as the variables described above. For example, the target variable may be used to determine whether a vibration is from a vehicle moving the wrong direction or from a non-vehicle crossing a highway (e.g., which may trigger another set of response actions, such as communicating with a dispatch device to deploy animal control).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of an observed time, distance, and amplitude, a second feature of an observed longitude coordinate and latitude coordinate, a third feature of a vehicle traveling south, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of yes for the target variable of whether the vehicle is traveling in the wrong direction for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, deploying emergency response vehicles. The first automated action may include, for example, transmitting a notification or disabling the vehicle, among other examples.

As another example, if the machine learning system were to predict a value of no for the target variable of whether the vehicle traveling is in the wrong direction, then the machine learning system may provide a second (e.g., different) recommendation (e.g., to inspect an optical fiber to determine whether a detected anomalous vibration has another cause) and/or may perform or cause performance of a second (e.g., different) automated action (e.g., altering fiber optic communication parameters of an optical fiber).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an vehicle traveling in the wrong direction), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a vehicle collision), then the machine learning system may provide a second (e.g., different) recommendation (e.g., deploying different emergency services vehicles to respond to the collision) and/or may perform or cause performance of a second (e.g., different) automated action, such as transmitting an alert to a hospital to prepare for an incoming ambulance.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine whether a vehicle is traveling in the wrong direction on a roadway. The machine learning system enables recognition and/or identification of tens, hundreds, thousands, or millions of features and/or feature values for tens, hundreds, thousands, or millions of observations, thereby increasing accuracy and consistency and reducing delay associated with whether a vehicle is traveling in the wrong direction on a roadway relative to requiring computing resources to be allocated for tens, hundreds, or thousands of operators to manually monitor fiber sensing data to determine whether a vehicle is traveling in the wrong direction on a roadway using the features or feature values.

As indicated above, FIG. 2 is provided as an example. Other examples may differ from what is described in connection with FIG. 2.

Figure 3:
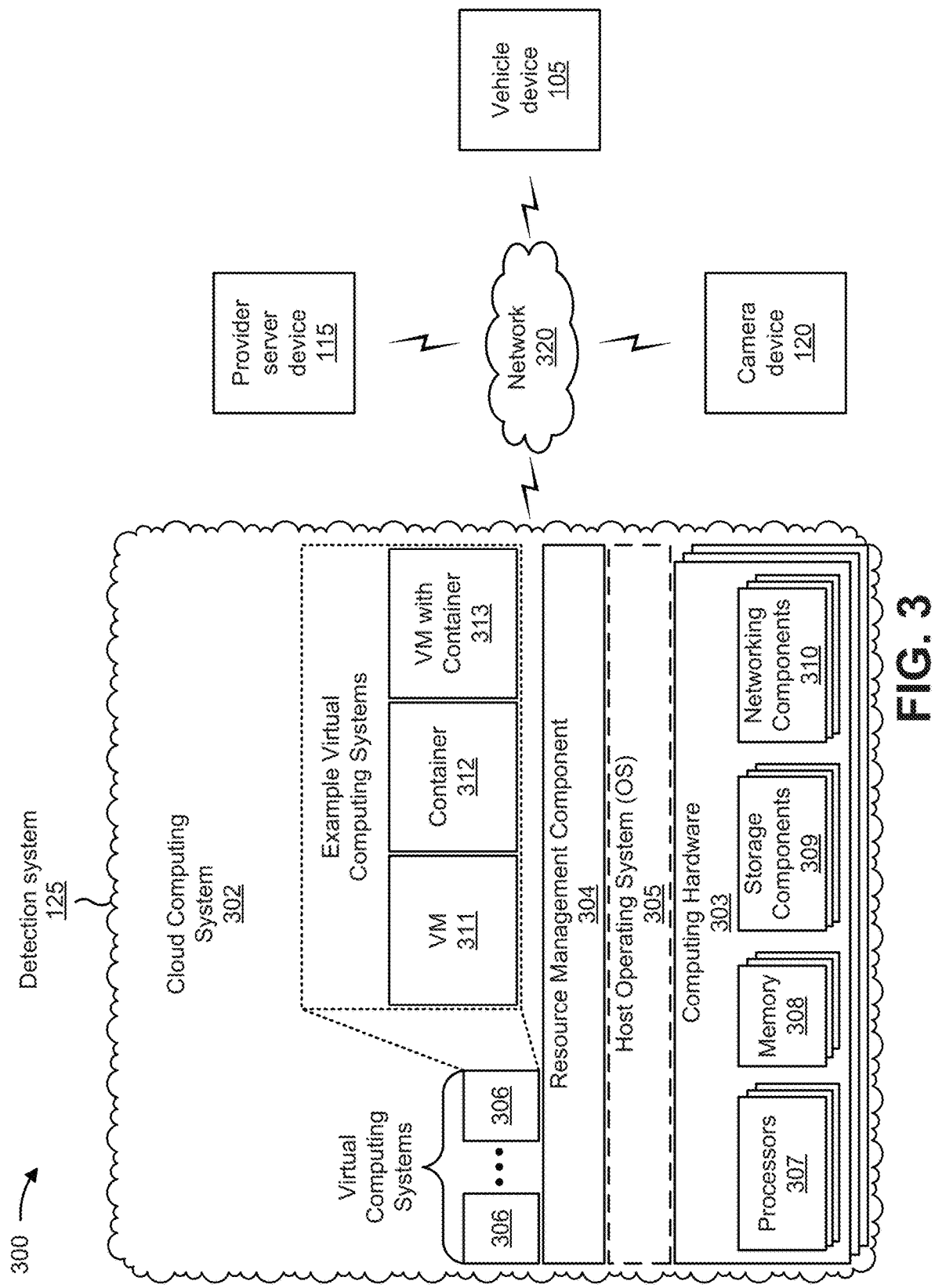
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include vehicle device 105, provider server device 115, camera device 120, detection system 125, which may include one or more elements of and/or may execute within a cloud computing system 302, and/or network 320. In some implementations, portions of environment 300 may be implemented in a multi-access edge computing (MEC) deployment. The cloud computing system 302 may include one or more elements 303-313, as described in more detail below. Devices and/or elements of environment 300 may interconnect via wired connections and/or wireless connections.

Vehicle device 105 includes one or more devices capable of receiving, generating, storing, processing, and/or providing information, such as information described herein. For example, vehicle device 105 may include a mobile phone (e.g., a smart phone), a laptop computer, a tablet computer, a handheld computer, a device included in vehicle 110 (e.g., an inertial measurement unit, a three-axis accelerometer, a global positioning system (GPS) device, an on-board diagnostics (OBD) device, an engine control unit (ECU), an interlock device, a dash camera, a parking assist camera, a backup assist camera or a telematics device), a car area network (CAN) bus, or a similar type of device. In some implementations, vehicle device 105 may receive information from and/or transmit information to other devices described herein.

Provider server device 115 includes one or more devices capable of receiving, generating, storing, processing, and/or providing information, such as information described herein. For example, provider server device 115 may include a server device, a group of server devices, or a similar type of device. In some implementations, provider server device 115 may be an endpoint of a fiber optic cable and may measure characteristics of light in the fiber optic cable and/or provide information regarding vibrations affecting the characteristics of the light in the fiber optic cable.

Camera device 120 includes one or more devices capable of receiving, generating, storing, processing, and/or providing information, such as information described herein. For example, camera device 120 may include a traffic camera, a mobile phone (e.g., a smart phone, a radiotelephone, and/or the like) equipped with a camera, a camera attached to a vehicle (e.g., a vehicle determined to be traveling in the incorrect direction, a vehicle that is traveling in the correct direction), a camera attached to an autonomous vehicle, a fixed camera, a surveillance or security camera, a backup camera, a computer equipped with an internal or external camera, an image and/or video capturing device, a three-hundred and sixty-degree camera, a digital camera, a video camera, a lidar device, a radar device, an ultrasound device, or a similar type of device. In some implementations, camera device 120 may receive information from and/or transmit information to other devices described herein.

Cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

Resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

Virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the detection system 125 may include one or more elements 303-313 of the cloud computing system 302, may execute within the cloud computing system 302, and/or may be hosted within the cloud computing system 302, in some implementations, the detection system 125 may not be cloud-based (e.g., may be implemented outside of a cloud computing system) or may be partially cloud-based. For example, the detection system 125 may include one or more devices that are not part of the cloud computing system 302, such as device 400 of FIG. 4, which may include a stand-alone server or another type of computing device. The detection system 125 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
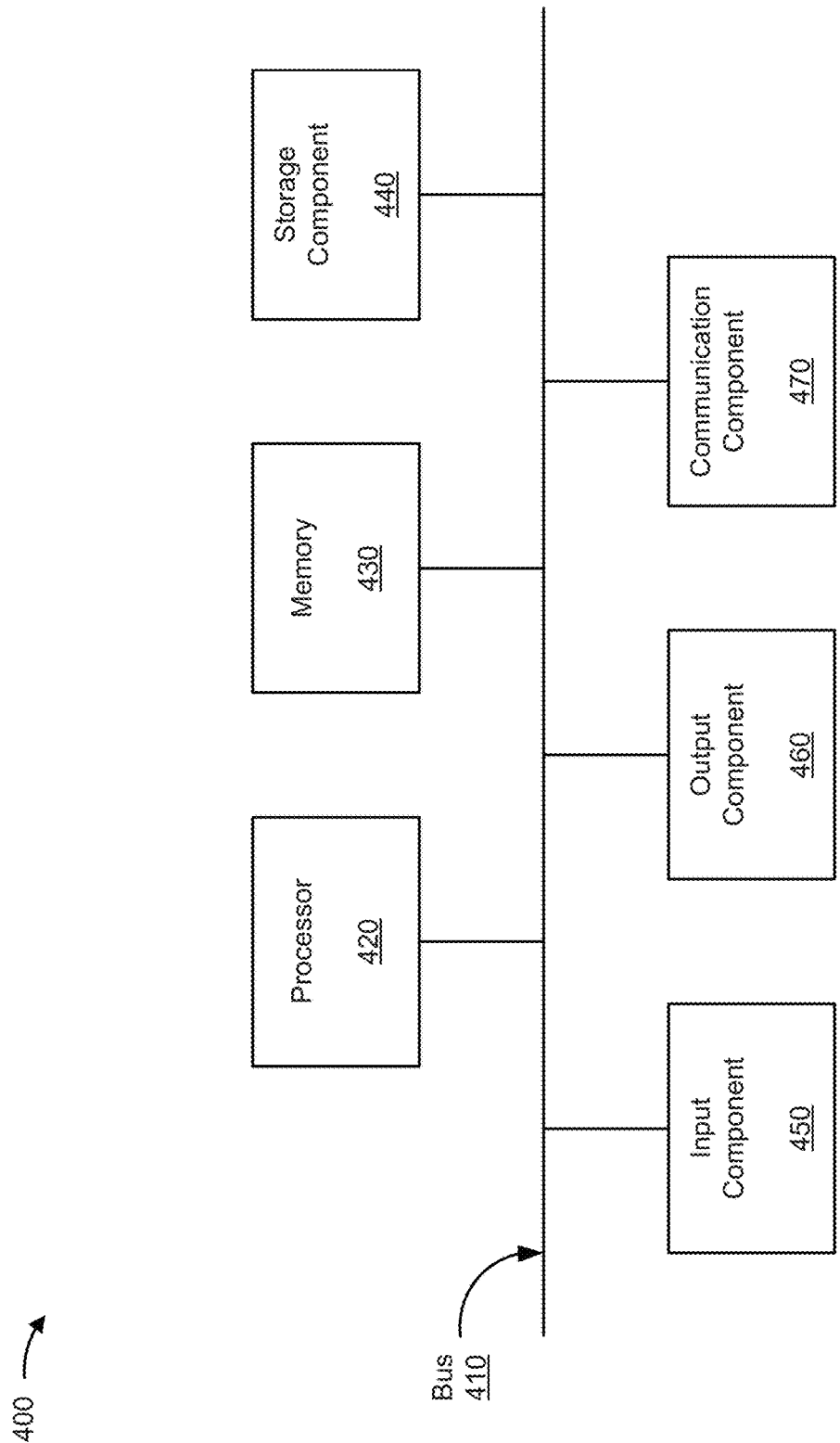
FIG. 4 is a diagram of example components of one or more devices of FIG. 2.

FIG. 4 is a diagram of example components of a device 400, which may correspond to vehicle device 105, provider server device 115, camera device 120, and/or detection system 125. In some implementations, vehicle device 105, provider server device 115, camera device 120, and/or detection system 125 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
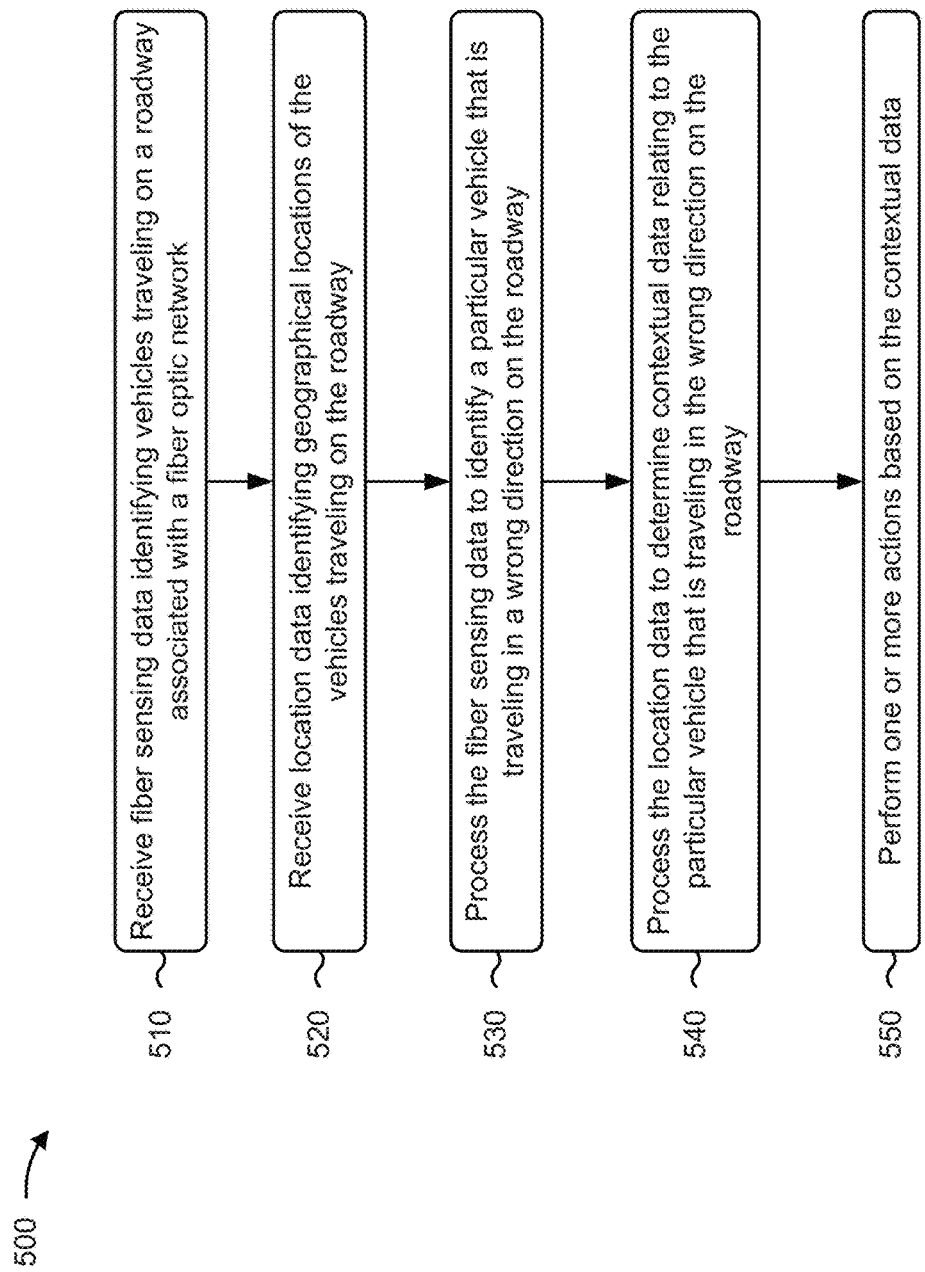
FIG. 5 is a flowchart of an example process relating to fiber optic based vehicle direction detection.

FIG. 5 is a flowchart of an example process 500 associated with systems and methods for fiber-optic based vehicle-direction detection. In some implementations, one or more process blocks of FIG. 5 may be performed by a device (e.g., detection system 125). In some implementations, one or more process blocks of FIG. 5 may be performed by another device or a group of devices separate from or including the device, such as a vehicle device (e.g., vehicle device 105), a provider server device (e.g., provider server device 115), and/or a camera device (e.g., camera device 120). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving fiber sensing data identifying vehicles traveling on a roadway associated with a fiber optic network (block 510). For example, the device may receive fiber sensing data identifying vehicles traveling on a roadway associated with a fiber optic network, as described above. The fiber sensing data includes data identifying amplitudes of vibrations sensed by fiber optic cables of the fiber optic network, times associated with the amplitudes of the vibrations, and distances associated with the amplitudes of the vibrations.

As further shown in FIG. 5, process 500 may include receiving location data identifying geographical locations of the vehicles traveling on the roadway (block 520). For example, the device may receive location data identifying geographical locations of the vehicles traveling on the roadway, as described above. The device may receive location data identifying the geographical locations of the vehicles traveling on the roadway from the vehicle devices of the vehicles, or receive location data identifying the geographical locations of the vehicles traveling on the roadway from the fiber sensing data.

As further shown in FIG. 5, process 500 may include processing the fiber sensing data to identify a particular vehicle that is traveling in a wrong direction on the roadway (block 530). For example, the device may process the fiber sensing data, with a machine learning model, to identify a particular vehicle, of the vehicles, that is traveling in a wrong direction on the roadway, as described above. In some implementations, processing the fiber sensing data to identify the particular vehicle, includes identifying vibrations, sensed by fiber optic cables of the fiber optic network, indicating a wrong direction of travel along the roadway, determining that the particular vehicle is associated with the vibrations indicating the wrong direction of travel along the roadway, and identifying the particular vehicle that is traveling in the wrong direction on the roadway based on determining that the particular vehicle is associated with the vibrations indicating the wrong direction of travel along the roadway. In some implementations, process 500 includes determining whether the particular vehicle is involved in an accident with one or more of the other vehicles on the roadway, receiving information associated with the accident when the particular vehicle is determined to be involved in the accident with the one or more of the other vehicles, and providing the information associated with the accident to a server device of emergency personnel.

In some implementations, process 500 includes identifying, based on the fiber sensing data, an object that is traveling in the wrong direction on the roadway, determining whether the object is not a vehicle based on the fiber sensing data, and preventing generation of an alert message when the object is not a vehicle. The device may calculate a plurality of thresholds indicating likelihoods that the particular vehicle is traveling in the wrong direction, apply weights to the plurality of thresholds to generate a plurality of weighted thresholds, combine the plurality of weighted thresholds to generate an overall threshold indicating a likelihood that the particular vehicle is traveling in the wrong direction, and determine that the particular vehicle is traveling in the wrong direction when the overall threshold is satisfied.

As further shown in FIG. 5, process 500 may include processing the location data to determine contextual data relating to the particular vehicle that is traveling in the wrong direction on the roadway (block 540). For example, the device may process the location data, with the machine learning model, to identify locations of the roadway, a cellular network associated with the roadway, and vehicle devices of the vehicles traveling on the roadway, other than the particular vehicle, and a nearest camera device to the particular vehicle, as described above. The device may process the location data, with the machine learning model, to identify a location of a camera device that is physically closest to a path of the particular vehicle, receiving video data identifying a video captured by the camera device, processing the video data, with a computer vision model, to identify additional vehicle devices of additional vehicles entering the roadway near the particular vehicle, and providing, to the additional vehicle devices, an alert message indicating that the particular vehicle is traveling in the wrong direction.

As further shown in FIG. 5, process 500 may include performing one or more actions based on the contextual data (block 550). For example, the device may perform one or more actions based on the locations of the roadway, the cellular network associated with the roadway, and the vehicle devices of the vehicles traveling on the roadway, other than the particular vehicle, as described above. The device may provide, to the vehicle devices of the vehicles traveling on the roadway, other than the particular vehicle, an alert message indicating that the particular vehicle is traveling in the wrong direction and indicating a predicted path of the particular vehicle, providing, to a server device associated with law enforcement, the alert message indicating that the particular vehicle is traveling in the wrong direction, or scheduling a driver of the particular vehicle for a driving course. The device may cause the particular vehicle to pull to a side of the roadway, provide, to a vehicle device of the particular vehicle, an alert message indicating that the particular vehicle is traveling in the wrong direction, provide information about the particular vehicle to an insurer of the particular vehicle, or modify the machine learning model based on identifying the particular vehicle traveling in the wrong direction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
receiving, by a device, fiber sensing data identifying vehicles traveling on a roadway associated with a fiber optic network, wherein the fiber sensing data includes data identifying one or more of:
amplitudes of vibrations sensed by fiber optic cables of the fiber optic network,
times associated with the amplitudes of the vibrations, or
distances associated with the amplitudes of the vibrations;
identifying, by the device, with a machine learning model, and based on processing of the fiber sensing data, a particular vehicle, of the vehicles traveling on the roadway, that is traveling in a wrong direction on the roadway; and
performing, by the device and based on identifying the particular vehicle, one or more actions to reduce a likelihood of a collision.

2. The method of claim 1, further comprising:
receiving location data identifying geographical locations of the vehicles traveling on the roadway; and
processing, with the machine learning model, the location data to identify the particular vehicle.

3. The method of claim 1, further comprising:
receiving video data identifying a video of the vehicles traveling on the roadway; and
processing, with the machine learning model, the video data to identify the particular vehicle.

4. The method of claim 1, wherein performing the one or more actions comprises one or more of:
providing, to vehicle devices of the vehicles traveling on the roadway, other than the particular vehicle, an alert message indicating that the particular vehicle is traveling in the wrong direction;
providing, to a server device associated with law enforcement, the alert message; or
scheduling a driver of the particular vehicle for a driving course.

5. The method of claim 1, wherein performing the one or more actions comprises one or more of:
causing the particular vehicle to pull to a side of the roadway;
providing, to a vehicle device of the particular vehicle, an alert message indicating that the particular vehicle is traveling in the wrong direction; or
providing information about the particular vehicle to an insurer of the particular vehicle.

6. The method of claim 1, wherein identifying the particular vehicle comprises:
identifying particular vibrations, sensed by fiber optic cables of the fiber optic network, that propagate in a direction that is opposite of a direction in which other vibrations propagate,
wherein the particular vibrations indicate a wrong direction of travel along the roadway;

determining that the particular vehicle is associated with the particular vibrations; and
identifying the particular vehicle based on determining that the particular vehicle is associated with the particular vibrations.

7. The method of claim 1, wherein the fiber sensing data includes data identifying:
the amplitudes of the vibrations,
the times associated with the amplitudes of the vibrations, and
distances associated with the amplitudes of the vibrations.

8. A device, comprising:
one or more processors configured to:
receive fiber sensing data identifying vehicles traveling on a roadway associated with a fiber optic network, wherein the fiber sensing data includes data identifying one or more of:
amplitudes of vibrations sensed by fiber optic cables of the fiber optic network,
times associated with the amplitudes of the vibrations, or
distances associated with the amplitudes of the vibrations;
process the fiber sensing data, with a machine learning model, to identify a particular vehicle, of the vehicles traveling on the roadway, that is traveling in a wrong direction on the roadway; and
perform one or more actions based on identifying the particular vehicle.

9. The device of claim 8, wherein the one or more processors are further configured to:
receive location data identifying geographical locations of the vehicles traveling on the roadway,
wherein the location data includes data identifying longitudinal and latitudinal coordinates; and
process, with the machine learning model, the location data to identify the particular vehicle.

10. The device of claim 9, wherein the one or more processors, when receiving the location data, are configured to receive the location data from vehicle devices of the vehicles traveling on the roadway.

11. The device of claim 8, wherein the one or more processors are further configured to:
receive video data identifying a video of the vehicles traveling on the roadway; and
process, with a computer vision component of the machine learning model, the video data to identify the particular vehicle.

12. The device of claim 8, wherein the one or more processors, when processing the fiber sensing data, with the machine learning model, to identify the particular vehicle, are configured to:
calculate a plurality of thresholds indicating likelihoods that the particular vehicle is traveling in the wrong direction;
apply weights to the plurality of thresholds to generate a plurality of weighted thresholds;
combine the plurality of weighted thresholds to generate an overall threshold indicating a likelihood that the particular vehicle is traveling in the wrong direction; and
determine that the particular vehicle is traveling in the wrong direction when the overall threshold is satisfied.

13. The device of claim 8, wherein the one or more processors, when performing the one or more actions, are configured to:

provide, to a network device associated with a cellular network, an alert message indicating that the particular vehicle is traveling in the wrong direction,
wherein the alert message causes the network device to one or more of:
provide a first alert message to vehicle devices of the vehicles traveling on the roadway, other than the particular vehicle,
provide a second alert message to a server device associated with law enforcement, or
provide a third alert message to a vehicle device of the particular vehicle.

14. A non-transitory computer-readable medium storing a set of instructions, the set of instructions comprising:
one or more instructions that, when executed by one or more processors of a device, cause the device to:
receive fiber sensing data identifying vehicles traveling on a roadway associated with a fiber optic network, wherein the fiber sensing data includes data identifying one or more of:
amplitudes of vibrations sensed by fiber optic cables of the fiber optic network,
times associated with the amplitudes of the vibrations, or
distances associated with the amplitudes of the vibrations;
process the fiber sensing data to identify a particular vehicle, of the vehicles, that is traveling in a wrong direction on the roadway; and
provide, to a network device associated with a cellular network, an alert message indicating that the particular vehicle is traveling in the wrong direction,
wherein the alert message causes the network device to provide the alert message to one or more of:
vehicle devices of the vehicles traveling on the roadway, other than the particular vehicle,
a server device associated with law enforcement, or
a vehicle device of the particular vehicle.

15. The non-transitory computer-readable medium of claim 14, wherein the fiber sensing data includes a fiber vibration graph that identifies variations in an optical signal traveling through a fiber optic cable in proximity to a roadway.

16. The non-transitory computer-readable medium of claim 15, wherein the one or more instructions, that cause the device to process the fiber sensing data to identify the particular vehicle, cause the device to:
use a machine learning model to determine whether the fiber vibration graph has a threshold match with a graph signature associated with the particular vehicle.

17. The non-transitory computer-readable medium of claim 14, wherein the one or more instructions further cause the device to one or more of:
schedule a driver of the particular vehicle for a defensive driving course;
cause the particular vehicle to be disabled;
provide information about the particular vehicle to an insurer of the particular vehicle; or
update a machine learning model, for processing the fiber sensing data, based on identifying the particular vehicle.

18. The non-transitory computer-readable medium of claim 14, wherein the one or more instructions further cause the device to:
receive, from the fiber sensing data, location data identifying geographical locations of the vehicles traveling on the roadway.

19. The non-transitory computer-readable medium of claim 14, wherein the one or more instructions, that cause the device to process the fiber sensing data to identify the particular vehicle, cause the device to:
calculate a plurality of thresholds indicating likelihoods that the particular vehicle is traveling in the wrong direction;
apply weights to the plurality of thresholds to generate a plurality of weighted thresholds;
combine the plurality of weighted thresholds to generate an overall threshold indicating a likelihood that the particular vehicle is traveling in the wrong direction; and
determine that the particular vehicle is traveling in the wrong direction when the overall threshold is satisfied.

20. The non-transitory computer-readable medium of claim 14, wherein fiber sensing data includes data identifying:
the amplitudes of the vibrations,
the times associated with the amplitudes of the vibrations, and
the distances associated with the amplitudes of the vibrations.

* * * * *